United States Patent

[11] 3,599,021

| [72] | Inventor | Jean Guimbal<br>52, Rue Henri Dechaud, 42 Saint-Etienne, (Loire), France |
|---|---|---|
| [21] | Appl. No. | 877,214 |
| [22] | Filed | Nov. 17, 1969 |
| [45] | Patented | Aug. 10, 1971 |
| [32] | Priority | Nov. 25, 1968 |
| [33] | | France |
| [31] | | 238 |

[54] ROTOR COOLING CONFIGURATION FOR DYNAMOELECTRIC MACHINES
9 Claims, 6 Drawing Figs.

[52] U.S. Cl. ................................................ 310/61
[51] Int. Cl. ................................................ H02k 1/32
[50] Field of Search ................................... 310/54—65

[56] References Cited
UNITED STATES PATENTS

| 2,913,606 | 11/1959 | Guardiola | 310/60.1 |
| 3,097,317 | 7/1963 | Fechheimer | 310/61 X |
| 3,098,941 | 7/1963 | Willyoung | 310/61 X |

*Primary Examiner*—D. F. Duggan
*Attorney*—Owen, Wickersham & Erickson

ABSTRACT: This invention relates to a high power rotary engine of the type comprising a stator and an inductive rotor comprising at least two poles and the winding of which is constituted by at least one coil for each pole and formed by a stack of conductors separated from one another by an insulator, said winding being disposed on the outer surface of a magnetic core in the form of a drum concentric to the axis of the rotor, comprising a cooling circuit constituted by grooves or slits made in or between the conductors of the rotor and fed with coolant fluid through a fluid inlet channel, wherein each conductor of the rotor is a flat, conductive and electrically continuous band, on the one hand wound around a salient pole on the cylinder of a winding, the different layers of superposed conductors constituting concentric cylinders and, on the other hand, fixed to the drum by bolts which are radial or slightly inclined with respect to said magnetic drum, and in that the slits for the passage of the coolant fluid are made transversely with respect to the length of the conductor.

Inventor
JEAN-MARIE CLAUDE
GUIMBAL
By
Owen, Wickersham & Erickson
Attorney

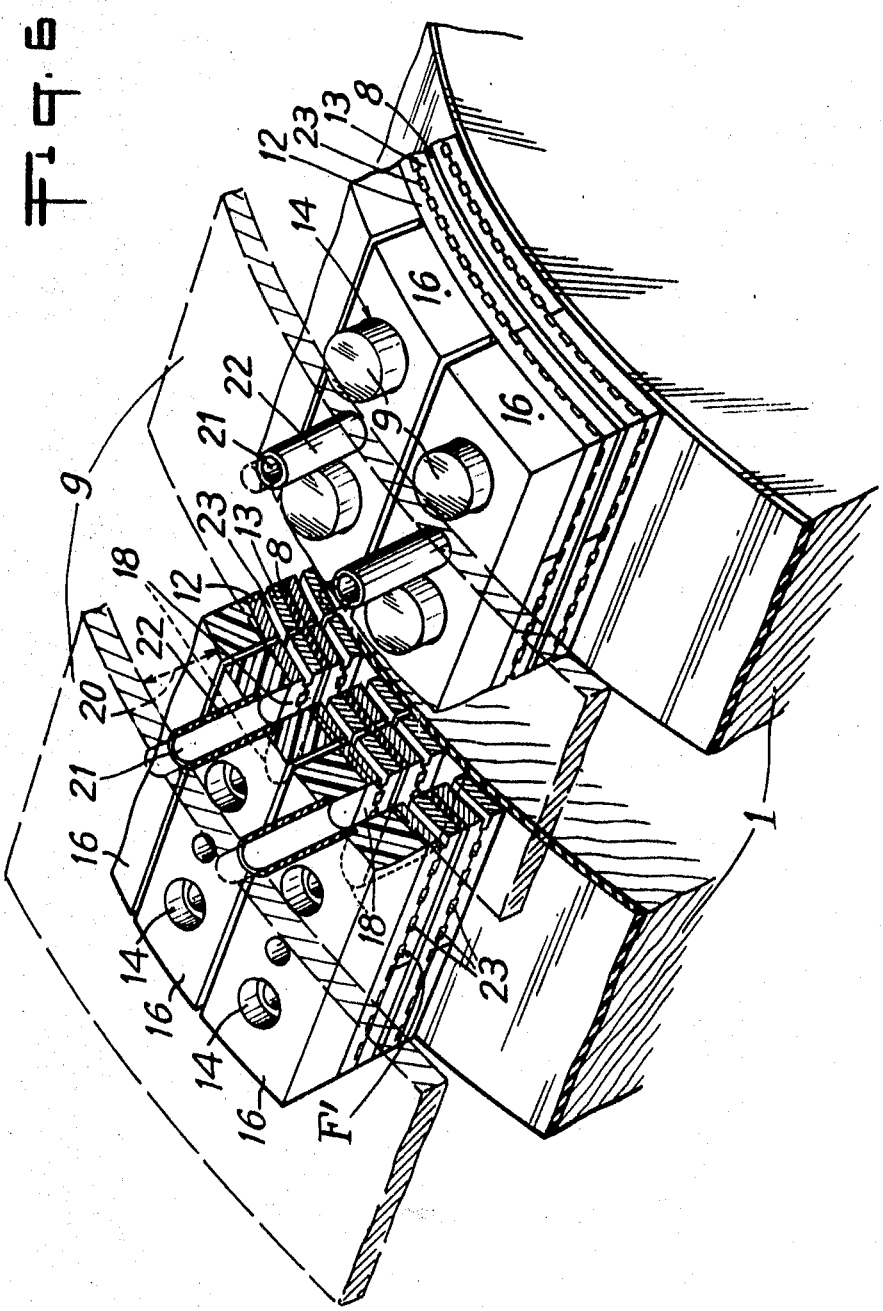

ROTOR COOLING CONFIGURATION FOR DYNAMOELECTRIC MACHINES

The present invention has for its object a high-power rotary engine, and more particularly a bipolar rotary engine with conductors in the airgap, which comprises a stator whose conductors may be housed in the airgap or in slots, and a rotor comprising a magnetic core and a field winding capable of increasing the magnetic flux of the rotor.

The rotors of the synchronous machines are conventionally produced according to one of the techniques known as the salient pole or the smooth rotor techniques.

In the engines which comprise salient poles, the coils surround the poles and are held in place by an enlargement of the part opposite the armature; moreover, on three of their sides, they are pressed against a wall. Consequently, they have a poor resistance to the centrifugal force produced by the rotation of the rotor and cannot be cooled in sufficiently effective manner.

In high-speed engines, the smooth rotor technique is employed, the smooth rotors permitting a better resistance to the centrifugal force: the conductors are arranged in slots milled in the magnetic drum. However, they are then surrounded on all sides and the cooling of such engines is even more difficult to effect. A sleeve is required to hold parts of the turns located at the ends, the function of which is to terminate the winding on each side of a pole. This arrangement presents the disadvantage of introducing a weak point, in this case the sleeve, which, under difficult conditions, opposes the effects of the centrifugal force.

The present invention obviates the above-mentioned disadvantages and makes it possible to transmit a greater flux whilst leaving a large space for the engines to cool. In addition, it ensures that the coils stand up better to the centrifugal force and thus permits either an increase in speed or an enlarged diameter, or both.

To this end, it has for its object a high-power rotary engine of the type comprising a stator and an inductive rotor comprising at least two poles and the winding of which is constituted by at least one coil for each pole and formed by a stack of conductors separated from one another by an insulator, said winding being disposed on the outer surface of a magnetic core in the form of a drum concentric to the axis of the rotor, and comprising a cooling circuit constituted by grooves or slits made in or between the conductors of the rotor and fed with coolant fluid through a fluid inlet channel, characterized in that each conductor of the rotor is a flat, conductive and electrically continuous band, on the one hand would around a salient pole on the cylinder of a winding, the different layers of superposed conductors constituting concentric cylinders, and on the other hand, fixed to the drum by bolts which are radial or slightly inclined with respect to said magnetic drum, and in that the slits for the passage of the coolant fluid are made transversely with respect to the length of the conductor.

Other details and particular features of the invention will be apparent from the description given hereinafter by way of nonlimiting example, with reference to the accompanying drawings, in which:

FIG. 6 is a partial view in perspective and in section of conductors superposed on the drum.

Figure 1:
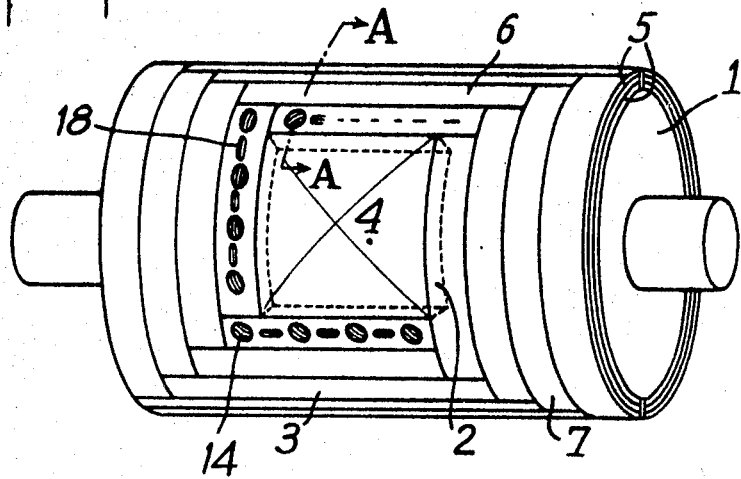
FIG. 1 is a schematic perspective view of the rotor according to the invention.

Referring now to the drawings, the stator (not shown) which is associated with the inductive rotor according to the invention (FIG. 1), may comprise a winding housed in slots as in conventional machines, or in the airgap as is the case in more recent rotary engines.

In accordance with the invention, the inductive rotor comprises a solid core in the form of a drum 1 having bosses 2 arranged at the level of the poles so as to reduce the airgap at the level of the poles in order not to have too great a power consumption in the inductor. These bosses 2 may either have been made directly with the body of the drum or attached to said drum body.

There are arranged on the body of the drum conductors 3, each of which is constituted by a flat, conductive and electrically continuous band would about a salient pole 4, the different superposed layers 5 of conductors for the same pole constituting concentric cylinders.

Figure 3:
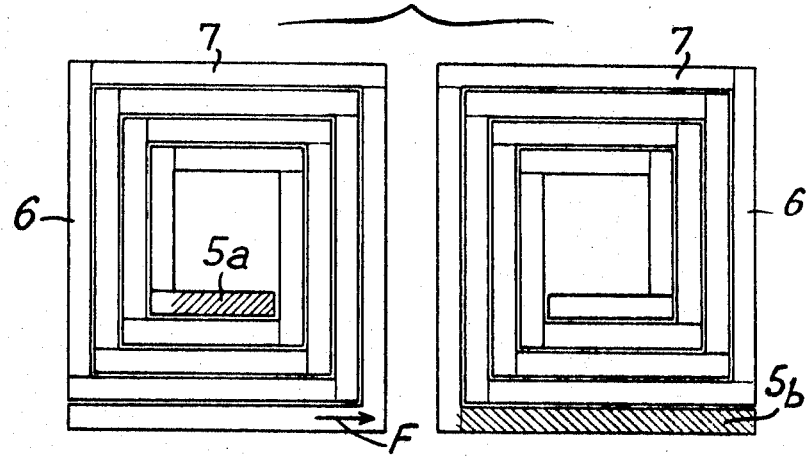
FIG. 3 is a developed view of two superposed layers of conductors according to the invention.

Each flat conductive and electrically continuous band is constituted by longitudinal band portions 6 disposed parallel to the axis of the drum 1 and by transverse and arcuate band portion 7, which connect the longitudinal band portions 6 in twos so as to terminate the winding around each pole 4 (FIG. 1). In order to obtain a coil associated with a pole 4, the flat conductive bands are superposed with the interposition therebetween of an insulating layer 8 (FIGS. 5 and 6) except, for example, on the part 5a of the left-hand layer of FIG. 3, if the winding was begun as shown in FIG. 3, with a current circulating in the direction of arrow F, and except on the part 5b of the right-hand layer located immediately thereabove and which is wound so that the current always circulates in the same direction. In the case of FIG. 3, the layers of level 2, 4, 6...,identical to the right-hand layer, are would in the trigonometrical direction, the layers of level 1, 3, 5...are wound in the opposite direction. Thus, the contact between the different turns is effected either in parts 5a or in parts 5b.

Figure 4:
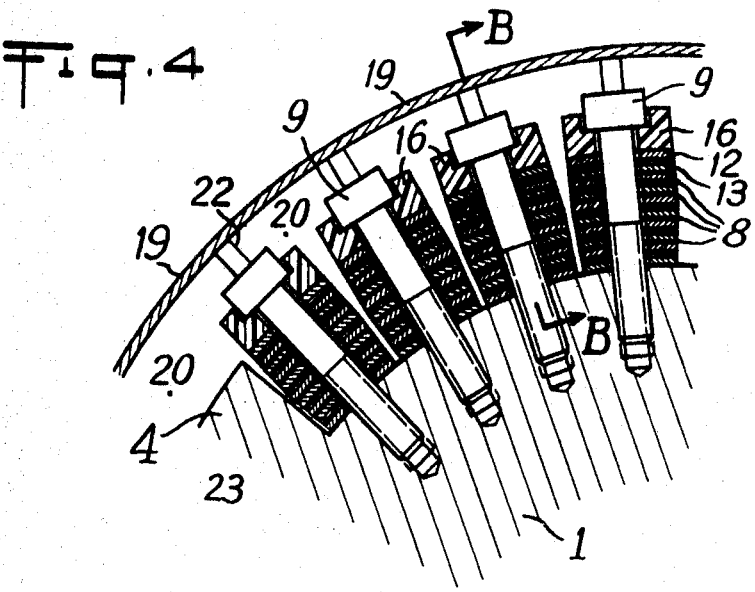
FIG. 4 is a sectional view along AA of FIG. 1.
Figure 5:
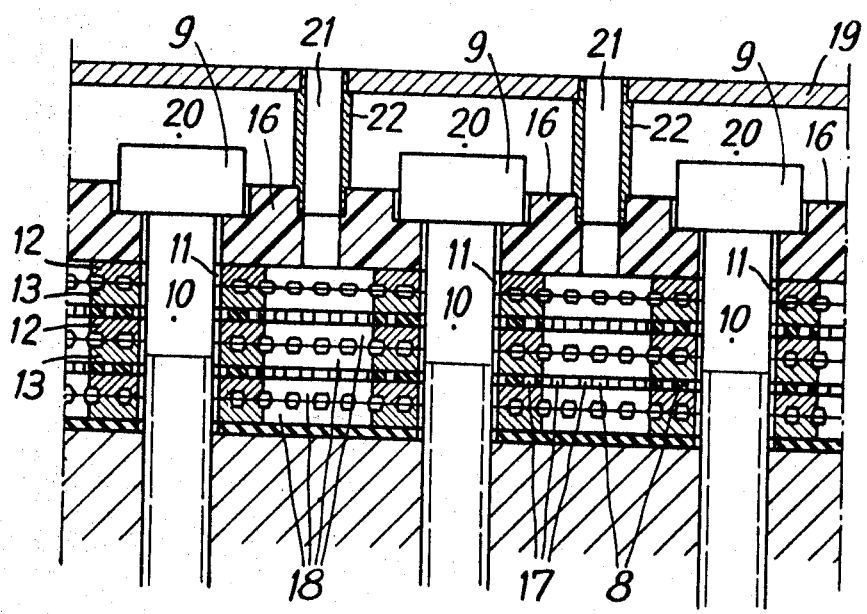
FIG. 5 is a sectional view, on an enlarged scale, along BB of FIG. 4.

Each portion of conductive band 6 or 7 is directly fixed to the drum 1 by means of bolts 9 (FIGS. 4 to 6). The rod 10 of the bolts 9 is insulated by an insulator 11 of the conductive band portions 6 and 7 and acts as magnetic bridge between the body of the rotor and the airgap proper to the superficial part of the conductive band portions. This fixation of the rotor winding makes it possible to employ an assembly arrangement of the front part of said rotor winding, which is both much more robust and much more economical. Moreover, this fixation permits a high peripheral speed and enables the diameter of the rotor to be enlarged and more power to be gained.

Figure 2:
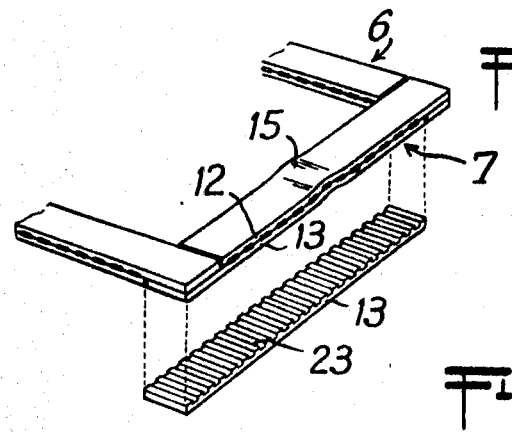
FIG. 2 is a perspective view of a connection between two band portions, one of which is longitudinal, the other transverse.

Each conductive band portion 6 and 7 is preferably constituted by two flat tapes 12 and 13 (FIG. 2). In order to obtain a winding of a layer in the same plane, the tapes 12 and 13 are shifted laterally, as shown in FIG. 2. Consequently, in the case shown, the upper tape 12 of the transverse band portion 7 is in contact with the lower tape 13 of the longitudinal band portion 6, whilst the lower tape 13 of said transverse band portion 7, but at the other end, is in contact with the upper tape 12 of the longitudinal band portion 6 located on the other side of the pole 4, the connection between the different tapes being effected by means of the bolts 9.

In addition, and in order to permit their expansion, corrugations 15 presenting a direction which is parallel for all the superposed band portions are provided for example between the holes 14 for the passage of the bolts both in the longitudinal and transverse band portions.

When the superposed layers 5 associated with each salient pole 4 of the inductive rotor are in place on the body of the drum 1, they are given the shape of said drum body by means of shims 16 (FIG. 6). These shims 16, which are parallelepipedic and arranged in the axis of the drum 1 hold the superposed layers 5 in place and serve as support for the bolts 9 whose heads are partially sunk in said shims 16. According to the power of the rotary engine, the shims 16 may either be separated from or may touch one another, defining, with the gaps between the coils constituted by the superposed layers of conductors associated with each pole, an inlet channel for the coolant fluid.

It is obvious that a single shim may be envisaged which rigidly holds all the superposed layers in place on the body of the drum and in which the heads of holding bolts would also be sunk.

These different arrangements enable the assembly obtained to be much more economical and more robust than with the conventional systems in which the coil heads are held by hoops at the ends of the rotor, and avoids the presence of a weak point that may provoke a deterioration of the engine as a result of a rupture of the elements constituting said rotary engine, under the effect of the electromechanical and dynamic forces involved in the rotary engine.

In order to increase the efficiency of the cooling, the coolant fluid is circulated from an inlet channel between the conductive band portions and perpendicularly to their length, and no longer longitudinally as in the engines manufactured heretofore. In this way, one has a cross section and exchange surface which are as high as desired.

To this end (FIG. 5), the insulator 8 is broken between two superimposed layers of band 5, so as to form transverse slits 17, the fluid, coming laterally at one end of the drum in the direction of the arrow F' (FIG. 6) passes through said transverse slits 17 then rises through radial vents 18 made in the band portions. In order to increase the cooling, the inlet channel for the coolant fluid is constituted by an envelope 19 made of reinforced plastics material, known per se, but arranging between it and the rotor coils a space 20 into which the coolant fluid is admitted. This latter, after having circulated in the transverse slits 17 of the radial vents 18 and in channels 21 made in distance-pieces 22 which may be laminated and which support said envelope 19, escapes into the airgap of the engine.

According to another embodiment, grooves 23 are milled on the faces opposite the tapes 12 and 13 constituting the band portions 6 and 7 (FIG. 2), so as to obtain transverse channels 24, with respect to the length of the band portions 6 and 7. It is of course possible, for a given conductive band, to provide only one series of grooves 23 on one of the tapes 12 or 13.

I claim:

1. A high power rotary engine of the type having a stator and an inductive rotor with at least two poles and winding, there being at least one coil for each pole, the winding being formed by a stack of conductors separated from one another by an insulator, said winding being disposed on the outer surface of a magnetic core in the form of a drum concentric to the axis of the rotor, said rotor having a cooling circuit constituted by passages in said stack of conductors of the rotor and fed with coolant fluid through a fluid inlet channel, said engine having the improvement wherein each conductor of the rotor is a flat, conductive and electrically continuous band wound around a salient pole on the cylinder of a winding, the different layers of superposed conductors constituting concentric cylinders, said band being fixed to the drum y bolts which extend generally radially with respect to said magnetic drum, and said passages for the coolant fluid extending transversely with respect to the length of the conductor.

2. A rotary engine as claimed in claim 1, wherein the flat, conductive and electrically continuous band is constituted by longitudinal band portions, arranged parallel to the axis of the drum and on either side of the pole, and by transverse and arcuate band portions which connect said longitudinal band portions in twos.

3. A rotary engine as claimed in claim 2, wherein each portion of conductive, electrically continuous band is constituted by at least two superposed tapes, and the connection between the longitudinal and transverse band portions is effected by alternate superposition of these tapes held in place by at least one said bolt.

4. A rotary engine as claimed in claim 2 wherein the band portions have corrugations between two holding bolts enabling them to expand.

5. A rotary engine as claimed in claim 2 wherein the layers of rotor conductors are held in place by means of at least one shim on which the heads of the holding bolts abut.

6. A rotary engine as claimed in claim 2 wherein each portion of conductive band comprises at least one radial vent connected to the transverse passages.

7. A rotary engine as claimed in claim 6, wherein bosses of the poles are made on the magnetic drum and are constituted by shims attached to the body of the drum.

8. A rotary engine as claimed in claim 6, wherein the transverse passages and the radial vents are fed with coolant fluid from a collector channel constituted by a space defined between an insulating envelope and the layers of rotor conductors, said envelope being held at a distance above said layers of conductors by means of insulating distance-pieces.

9. A rotary engine as claimed in claim 5, wherein the holding shim defines with the gaps made between the stacks of conductors associated with each pole, an inlet channel for the coolant fluid.